United States Patent
Sall et al.

(10) Patent No.: US 7,137,005 B2
(45) Date of Patent: Nov. 14, 2006

(54) METHOD OF WATERMARKING DIGITAL DATA

(75) Inventors: Mikhail Anatolyevich Sall, St. Petersburg (RU); Alexander Leonidovich Mayboroda, St. Petersburg (RU); Viktor Vikrorovich Redkov, St. Petersburg (RU); Anatoly Igorevich Tikhotsky, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 709 days.

(21) Appl. No.: 10/106,853

(22) Filed: Mar. 27, 2002

(65) Prior Publication Data

US 2002/0184502 A1   Dec. 5, 2002

Related U.S. Application Data

(60) Provisional application No. 60/279,123, filed on Mar. 28, 2001.

(51) Int. Cl.
   *H04L 9/00* (2006.01)
(52) U.S. Cl. .................. 713/176; 708/514; 708/520; 382/253
(58) Field of Classification Search .............. 713/176; 380/203; 708/514, 520; 382/253
   See application file for complete search history.

(56) References Cited

U.S. PATENT DOCUMENTS 6,611,599 B1 * 8/2003 Natarajan .................. 380/203
6,678,389 B1 * 1/2004 Sun et al. .................. 382/100
6,853,676 B1 * 2/2005 Kim ............................ 375/130

OTHER PUBLICATIONS

F. Hartung and M. Kutter, Multimedia Watermarking Techniques, Proc. IEEE, vol. 87, No. 7, pp. 1079-1107, Jul. 1999.*

Wolfgang et al., "Overview of image security techniques with applications in multimedia systems", Proceedings of the SPIE Conference on Multimedia Networks: Security, Displays, Terminals, and Gateways, vol. 3228, Nov. 2-5, 1997, Dallas, Texas, pp. 297-308.

* cited by examiner

*Primary Examiner*—Emmanuel L. Moise
*Assistant Examiner*—Tamara Teslovich
(74) *Attorney, Agent, or Firm*—Fleshner & Kim LLP

(57) ABSTRACT

A method of introducing a non-perceptional signal (watermark) to a digital media data is disclosed. The method is based on the representation of source digital data using a special matrix, insertion of a digital watermark into the special matrix to receive the watermarked matrix, and generation of the watermarked data using the source data and the watermarked matrix. In addition, watermark detection of the watermarked data is performed by calculating the special matrix from the watermarked data.

10 Claims, 2 Drawing Sheets

METHOD OF WATERMARKING DIGITAL DATA

CROSS-REFERENCE TO RELATED APPLICATIONS

This application claims the benefit of U.S. Provisional Application No. 60/279,123, filed on Mar. 28, 2001, in the name of inventors M. A. Sall, A. L. Mayboroda, V. V. Redkov, and A. I. Tikhotsky, titled "THE METHOD OF WATERMARKING OF DIGITAL DATA", which is hereby incorporated by reference as if fully set forth herein.

BACKGROUND OF THE INVENTION

1. Field of the Invention

The present invention relates to copyright protection of source digital data, and more particularly, to a method of protecting source digital data by inserting a watermark into the source data in a manner that an unintended third party who intercepts an informational medium is not able to determine the presence and the informational content of the watermark.

2. Discussion of the Related Art

Digital multimedia data are widely distributed on the Internet or with the usage of many types of storage such as CD-ROM, hard and floppy disks, and etc. The copyright of the multimedia data has become one of many problems of such distribution processes. One of many ways of protecting any intellectual property right of a multimedia data set is to employ a digital watermark.

The currently existing watermarking techniques base on the representation of source digital or non-digital data in a digital form, which corresponds to a certain domain. The most popular watermarking techniques are spatial-domain and frequency-domain watermarking techniques. The present invention relates to representation of source data an eigen-vector domain, which has never been introduced before.

The main goals of the watermarking methods are non-perceptivity of watermarks and robustness against any attacks. The possible attacks are loose-compression, filtering, re-sampling attacks, and so on. Some of the mentioned goals may contradict with one another because the non-perceptivity means the weak alteration of the source data, and this weak alteration may be eliminated by certain attacks.

SUMMARY OF THE INVENTION

Accordingly, the present invention is directed to a method of watermarking digital data that substantially obviates one or more problems due to limitations and disadvantages of the related art.

An object of the present invention is to provide a method of watermarking digital data that is robust against any prevailing attacks.

Another object of the present invention is to provide a method of watermarking digital data that provides strong non-perceptivity of a watermark by spreading the watermark in a large volume of a source digital data set.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of inserting a watermark into digital media data includes the steps of calculating a working matrix X, each element of which is a predetermined function of each subset of source digital data; calculating a matrix C by $C=XX^T$; calculating eigen-values and an eigen-vector-matrix P of the matrix C; calculating a matrix of main components Y by $Y=P^TX$; and choosing k strings of the matrix Y.

The method further includes the steps of calculating coefficients $$a_q, 1 \le q \le k \text{ by using} \sum_{q=1}^{k} a_q y_{i_p, j_q} w_p,$$

wherein a watermark is represented by $w_1, w_2, K, w_k$; calculating a marked string $z_j$ by $$z_j = \sum_{q=1}^{k} a_q y_{i_p, j}, 1 \le j \le n$$

and replacing one of the chosen strings of Y with $z_j$; calculating a matrix $\tilde{Y}$ orthogonalized from the matrix $\hat{Y}$; calculating a watermarked working matrix $\tilde{X}$ by $\tilde{X}=P\tilde{Y}$; and marking the source digital data using the watermarked working matrix $\tilde{X}$.

In another aspect of the present invention, a method of detecting a watermark from digital media data includes the steps of calculating a working matrix X, each element of which is a predetermined function of each subset of source digital data; calculating a matrix C by $C=XX^T$; calculating eigen-values and an eigen-vector-matrix P of the matrix C; calculating a matrix of main components Y by $Y=P^TX$; and calculating a normalized submatrix using the matrix Y.

The method further includes the steps of calculating an average of modulo by using the normalized submatrix; determining a string number of a watermarked string of the matrix Y using the average of modulo; and extracting a watermark using the string number.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A watermark is a set of numbers $w_1, w_2, K, w_k$, where $w_s = \pm 1$. A set of numbers having opposite signs $-w_1, -w_2, -K, -w_k$ is treated as being same as $w_1, w_2, K, w_k$. Each watermark is associated with its corresponding watermark positioning data. Some of the positioning data are subsets of the source digital data $S_{ij}$, where $1 \leq i \leq m$ and $1 \leq j \leq n$. These subsets characterize time and/or spatial localization of each watermark. Each subset of the source digital data, $S_{ij}$ is defined as a set of numerical variables $\{t_s^{(ij)}\}$, where $1 \leq s \leq N_{ij}$.

Another set of the watermark positioning data is a set of functions $f_{ij}$, where $1 \leq i \leq m$ and $1 \leq j \leq 1$. Each function is defined in $S_{ij}$ and is used for the determination of a working matrix $X = \{x_{ij}\}$, $1 \leq i \leq m$ and $1 \leq j \leq n$ by using the equation $x_{ij} = f_{ij}(S_{ij}) = f_{ij}(t_1^{(ij)}, t_2^{(ij)}, K, t_{N_{ij}}^{(ij)})$. The set of functions $f_{ij}$ is responsible for the watermarking mode. A set of numbers $j_1, j_2, K, j_k$ ($1 \leq j_s \leq n$) defines the watermark position in the matrix of main components (see below). A rule of numerical data ($\{\tilde{t}_s^{(ij)}\}$) restoration corresponds to the watermarked source digital data. This rule must satisfy the conditions described below. This rule may be formulated algorithmically or by mathematical formulas.

The knowledge of localization and mode is the main factor that allows extracting information from the watermark. The rule of numerical data restoration influences on the perception properties of the watermark and its robustness to any attacks. This rule may be varied from one watermark to another in a way that the restriction conditions are satisfied.

Figure 1:
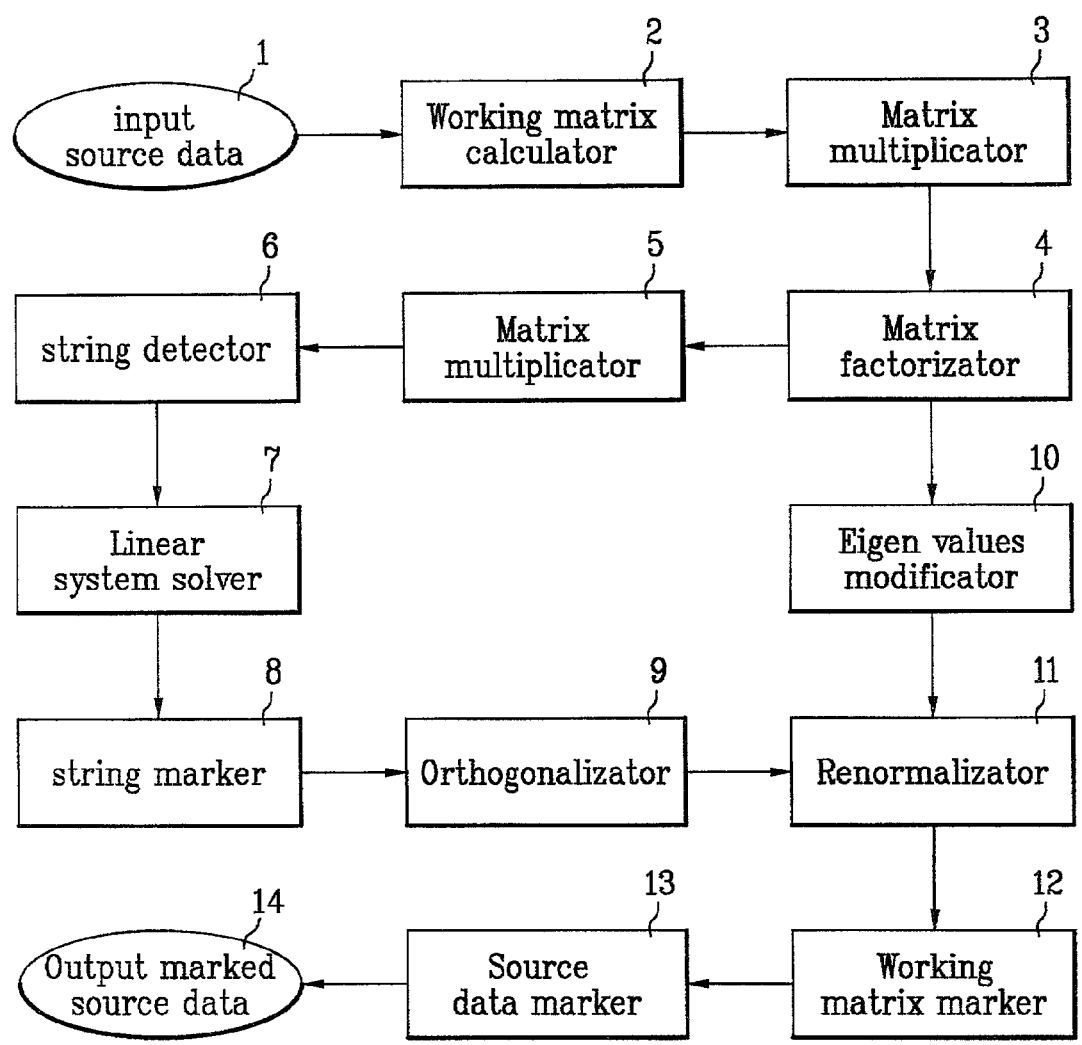
FIG. 1 illustrates a method of inserting a watermark in accordance with the present invention.

The method of watermarking in accordance with the present invention includes the method of inserting a watermark and the method of detecting the watermark and extracting the copyright information. The method of the watermark insertion in accordance with the present invention shall be presented with reference to FIG. 1.

First of all, the input source data block 1 performs the necessary input operations (buffering and etc.). Next, the working matrix calculator 2 performs the calculation of the working matrix $X = \{x_{ij}\}$, where $x_{ij} = f_{ij}(S_{ij}) = f_{ij}(t_1^{(ij)}, t_2^{(ij)}, K, t_{N_{ij}}^{(ij)})$. The matrix multiplicator 3 calculates a matrix C by using $C = XX^T$, where $X^T$ is a matrix transposed to X. Then the matrix factorizator 4 calculates the eigen-vectors and eigen-values of the matrix C.

The matrix C may be represented as $C = P\Lambda P^T$, where P represents the matrix of the eigen-vectors, $PP^T = E$, E represents a unit matrix, and $\Lambda$ represents a diagonal matrix that consists of its eigen-values so that $\Lambda = \text{diag}(\lambda_1, \lambda_2, K, \lambda_m)$. The eigen-values are ordered so that $\lambda_1 \leq \lambda_2 \leq K \leq \lambda_m$.

The matrix multiplicator 5 calculates the matrix of the main components $Y = P^T X$, where $Y = \{y_{ij}\}$, $1 \leq i \leq m$, and $1 \leq j \leq n$. The main property of the matrix Y is that $YY^T = \Lambda$. This means that each string of the matrix Y is orthogonal to others. The strings of the matrix Y that correspond to large eigen-values (last strings) are essential. In contrast, the strings that correspond to small eigen-values (first strings) are not essential and may be drastically changed.

The string detector 6 selects k strings of the matrix Y. The selection of these strings is defied by two restrictions. First of them is that a determinant obtained as the intersection of these strings and columns $j_1, j_2, K, j_k$ of the matrix Y is not equal to zero. Second, these strings must be situated in the top part of the matrix Y. The numbers of these strings are $i_1, i_2, K, i_k$.

Next, the linear system solver 7 finds the coefficients $a_q$, $1 \leq q \leq k$ from the system $$\sum_{q=1}^{k} a_q y_{i_p, j_q} = w_p, \ 1 \leq p \leq k.$$

Then the string marker 8 calculates the marked string $$z_j = \sum_{q=1}^{k} a_q y_{i_p, j},$$

$1 \leq j \leq n$ and replaces one of the strings $j_1, j_2, K, j_k$ of the matrix Y by using the marked string. Thereafter, the orthogonalizator 9 changes another strings among $i_1, i_2, K, i_k$ of the matrix 7 by using the standard orthogonalization procedure in a way that all of them are orthogonal to each other and to the string changed by $z_1, z_2, K, z_k$. The result of this and previous items is the matrix $\tilde{Y}$ with elements marked as $\tilde{y}_{uv}$.

Next, the eigen-value modificator 10 converts $\lambda_{i_p}$ to $\tilde{\lambda}_{i_p}$. The choice of new eigen-values is defined by two factors: the level of distortion due to typical attacks and the level of possible distortion due to watermarking. It means that this choice depends on the informational content and may differ in different cases (e.g., for audio signals and images). In the simplest case, $\tilde{\lambda}_{i_p} = \lambda_{i_p}$.

The renormalizator 11 renormalizes the strings $i_1, i_2, K, i_k$ of the matrix $\tilde{Y}$ in a way that satisfies $$\sum_{j=1}^{n} \tilde{y}_{i_p, j}^2 = \tilde{\lambda}_{i_p}.$$

Then, the working matrix marker 12 finds a watermarked working matrix $\tilde{X} = P\tilde{Y}$, where $\tilde{X} = \{\tilde{x}_{ij}\}$, $1 \leq i \leq m$, and $1 \leq j \leq n$.

The source data marker 13 finds the marked sets of numerical variables $\{\tilde{t}_s^{(ij)}\}$, $1 \leq s \leq N_{ij}$ using the equations $x_{ij} = f_{ij}(t_1^{(ij)}, t_2^{(ij)}, K, t_{N_{ij}}^{(ij)})$ and $\tilde{x}_{ij} = f_{ij}(\tilde{t}_1^{(ij)}, \tilde{t}_2^{(ij)}, K, \tilde{t}_{N_{ij}}^{(ij)})$. If we denote $\Delta t_s^{(ij)} = \tilde{t}_s^{(ij)} - t_s^{(ij)}$, then the equation $\tilde{x}_{ij} = f_{ij}(t_1^{(ij)} + \Delta t_1^{(ij)}, t_2^{(ij)} + \Delta t_2^{(ij)}, K, t_{N_{ij}}^{(ij)} + \Delta t_{N_{ij}}^{(ij)})$ is an equation for $N_{ij}$ unknown variables $\Delta t_s^{(ij)}$. It means that $N_{ij} - 1$ additional relationships between unknown variables may be introduced. These relationships will be responsible for the perceptivity of a watermark and its robustness to any attacks. In most cases of small values of unknown variables, the linear expansion of the equation leads to $$\tilde{x}_{ij} = x_{ij} + \sum_{s=1}^{N_{ij}} \frac{\partial f_{ij}(t_1^{(ij)}, t_2^{(ij)}, K, t_{N_{ij}}^{(ij)})}{\partial t_s} \Delta t_s^{(ij)}.$$

This equation is a linear equation for $N_{ij}$ unknown variables $\Delta t_s^{(ij)}$, where $1 \leq s \leq N_{ij}$. Arbitrariness in the choice of these unknown variables may be used for the best masking of a watermark. Some of the unrestricted examples of this choice are: $N_{ij}-1$ variables $\Delta t_s^{(ij)}$ may be zeroed, all of them may be equal to a variable $\Delta t$, and all of them may be proportional to $\tilde{t}_s^{(ij)}$: $\Delta t_s^{(ij)} = t_s^{(ij)} \Delta t$. Finally, the output marked source data block 14 finally performs the resulting output operations.

Figure 2:
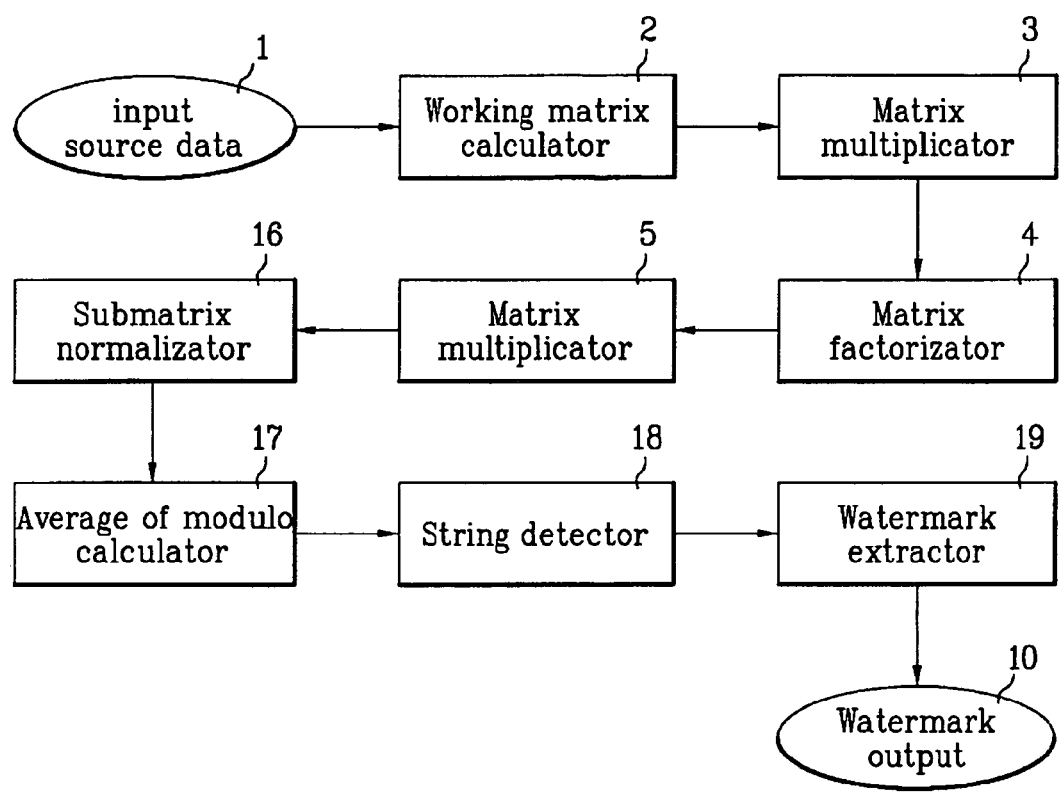
FIG. 2 illustrates a method of detecting a watermark and extracting copyright information in accordance with the present invention.

The method of the watermark detection and extraction of the copyright information in accordance with the present invention shall be presented with reference to FIG. 2.

First of all, the input source data block 1 performs the necessary input operations including buffering and etc. Next, the working matrix calculator 2, matrix multiplicator 3, matrix factorizator 4, and matrix multiplicator 5 perform the same functions as shown and described earlier for the method of the watermark insertion.

Then submatrix normalizator 16 calculates a normalized submatrix $\{\bar{y}_{ij_s}\}$, $1 \leq i \leq n$, $1 \leq s \leq k$, $$\text{where } \bar{y}_{ij_s} = y_{ij_s} \bigg/ \sqrt{\sum_{p=1}^{k} y_{ij_p}^2}.$$

Thereafter, the average of modulo calculator 17 calculates $$\hat{y}_i = \frac{1}{k} \sum_{s=1}^{k} |\bar{y}_{ij_s}|,$$

where $1 \leq i \leq n$. Next, the string detector 18 finds the minimal value of $$M_i = \sum_{s=1}^{k} (|\bar{y}_{ij_s}| - \hat{y}_i)^2,$$

where $1 \leq i \leq n$. The watermarked string $i_w$ corresponds to the string of the matrix Y with the minimal value of $M_i$. The watermark extractor 19 calculates a watermark $w_s$=sign $(y_{i_w j_s})$, where $1 \leq s \leq k$. Finally, the output marked source data block 10 performs the resulting output operations.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of inserting a watermark into digital media data, the method comprising:
   calculating a working matrix X, each element of which is a predetermined function of each subset of source digital data;
   calculating a matrix C by $C=XX^T$;
   calculating eigen-values and an eigen-vector-matrix P of said matrix C;
   calculating a matrix of main components Y by $Y=P^T X$;
   choosing k strings of said matrix Y;
   calculating coefficients $a_q$, $1 \leq q \leq k$ by using $$\sum_{q=1}^{k} a_q y_{i_p j_q} = w_p,$$

wherein a watermark is represented by a set of numbers $w_1, w_2, K, w_k$, where $1 \leq p \leq k$ with k and p being integers and where $y_{i_p j_q}$ is a string is matrix Y corresponding to an eigenvalue, with i and j signifying rows and columns with the matrix Y;
calculating a marked string $z_j$ by $$z_j = \sum_{q=1}^{k} a_q y_{i_p j},$$

$1 \leq j \leq n$, with n being an integer, and replacing one of said chosen strings of Y with $z_j$;
calculating a matrix $\tilde{Y}$ orthogonalized from said matrix Y;
calculating a watermarked working matrix $\tilde{X}$ by $\tilde{X}=P\tilde{Y}$; and
marking said source digital data using said watermarked working matrix $\tilde{X}$.

2. The method of claim 1, wherein said watermark is a set of predetermined numerical elements, each of which is equal to +1 or −1.

3. The method of claim 1, wherein said eigen-values are sorted in an increasing order of magnitude.

4. The method of claim 1, wherein said string choosing step is performed in a manner that a matrix received as intersection of said chosen k strings of Y with a same number of a predefined number of columns must have a non-zero determinant.

5. The method of claim 1, wherein said orthogonalized matrix $\tilde{Y}$ is calculated using a standard orthogonalization procedure and said chosen strings of Y in a manner that said replaced string is not changed and all other non-replaced strings of Y are orthogonal to said replaced string.

6. The method of claim 1, further comprising the step of modifying some of said eigen-values that correspond to said chosen strings of Y.

7. A method of detecting a watermark from digital media data, the method comprising:
   calculating a working matrix X, each element of which is a predetermined function of each subset of source digital data;
   calculating a matrix C by $C=XX^T$;
   calculating eigen-values and an eigen-vector-matrix P of said matrix C;
   calculating a matrix of main components Y by $Y=P^T X$;
   calculating a normalized submatrix using said matrix Y;
   calculating an average of modulo by using said normalized submatrix;
   determining a string number of a watermarked string of said matrix Y using said average of modulo; and
   extracting a watermark using said string number.

8. The method of claim 7, wherein said eigen-values are sorted in an increasing order of magnitude.

9. The method of claim 7, wherein said normalized submatrix calculation is performed with strings of a submatrix received as intersection of strings of Y with a predefined number of columns of Y.

10. The method of claim 7, wherein said average of modulo calculating step is performed for each string of said normalized submatrix.

* * * * *